United States Patent [19]

Viertel et al.

[11] Patent Number: 5,468,041
[45] Date of Patent: Nov. 21, 1995

[54] SWIVEL BEARING BRACKET FOR VEHICLE SUN VISORS

[75] Inventors: Lothar Viertel, Altforweiler, Germany; Patrick Welter, La Chambre, France

[73] Assignee: Gebr. Happich GmbH, Germany

[21] Appl. No.: 267,808

[22] Filed: Jun. 28, 1994

[30] Foreign Application Priority Data

Aug. 9, 1993 [DE] Germany ............... 43 26 660.6

[51] Int. Cl.⁶ ..................................... B60J 3/02
[52] U.S. Cl. ........................... 296/97.9; 248/222.52
[58] Field of Search ................... 296/97.9, 97.12; 248/289.1, 222.3

[56] References Cited

U.S. PATENT DOCUMENTS

| | | |
|---|---|---|
| 3,017,217 | 1/1962 | Keating . |
| 4,913,484 | 4/1990 | Dowd et al. . |
| 4,989,911 | 2/1991 | Van Order . |
| 5,056,853 | 10/1991 | Van Order . |
| 5,061,005 | 10/1991 | Van Order et al. . |
| 5,062,608 | 11/1991 | Phelps et al. . |
| 5,082,322 | 6/1992 | Cekander et al. . |
| 5,098,151 | 3/1992 | Peterson . |
| 5,201,564 | 4/1993 | Price . |
| 5,314,227 | 5/1994 | Weiland et al. ............... 296/97.9 |
| 5,411,310 | 5/1995 | Viertel et al. ............... 296/97.9 |

FOREIGN PATENT DOCUMENTS

| | | |
|---|---|---|
| 0413584 | 2/1991 | European Pat. Off. . |
| 1965143 | 12/1969 | Germany . |
| 2341940 | 8/1973 | Germany . |
| 7415154 | 8/1974 | Germany . |
| 2544969 | 10/1975 | Germany . |
| 1468954 | 5/1974 | United Kingdom . |
| 1539093 | 10/1975 | United Kingdom . |

*Primary Examiner*—Joseph D. Pape
*Attorney, Agent, or Firm*—Ostrolenk, Faber, Gerb & Soffen

[57] ABSTRACT

The swivel-bearing bracket of plastic has a base body, a rear support dome on its rear side and a passage hole for a sun-visor shaft. For the attachment without screws of the swivel-bearing bracket to the ceiling of the vehicle, two fastening elements, with cross member and oppositely directed hooks, are spaced from the supporting dome and are formed on the rear side of the base body. The hooks can be inserted through openings in the ceiling and can be engaged behind the ceiling by the turning the base body. For locking in the fastening elements, pins are introduced into the openings in the ceiling and are engaged with the cross members. The pins are on respective caps over window openings in the base body.

15 Claims, 3 Drawing Sheets

SWIVEL BEARING BRACKET FOR VEHICLE SUN VISORS

BACKGROUND OF THE INVENTION

The present invention refers to a swivel bearing bracket for vehicle sun visors and to means for affixing the bracket to a vehicle ceiling.

The bracket is comprised of a plastic injection molding including a flange-like base body and it has a support dome formed on its rear side. The dome has a passage hole which also extends through the base body for receiving the swivel shaft of the visor.

Swivel bearing brackets for sun visors serve to receive one arm of an L-shaped sun visor shaft in a manner permitting swinging rotation of the visor around a first arm of the visor shaft. The second arm of the visor shaft is mounted in the sun visor body. This enables the sun visor body to be swung either in front of the windshield or toward a side window of the vehicle. While it is in its normal position in front of the windshield, the sun visor is supported by two shafts, the L-shaped sun visor shaft and an outer support shaft on the visor body which is detachably engaged in an outer support bracket which is attached on the vehicle ceiling. The weight of the sun visor body, when it is in its position swung in front of the side window, rests exclusively on the L-shaped sun visor shaft, the swivel bearing bracket and the attachment of the bracket to the ceiling. For this reason, dependable fastening of the swivel bearing bracket on the ceiling of the vehicle is important. Therefore, the bracket is fastened to the ceiling by screws, as shown, for instance, in German patent publication 25 44 969 B2. In that case, however, the bracket must be positioned very carefully in order to align with the screw holes. This installation process has proven to be lengthy and tedious. Further, it is particularly disadvantageous in the traditional type of attachment for the considerable mounting work which is caused by the necessary screwing in of the parts, with the resulting expense.

German patent publications 23 41 940 A1 or 29 39 124 A1, disclose attaching the swivel bearing bracket to a vehicle body without screws. But, these proposals have not gone beyond the experimental stage, i.e. they have never entered into practical use, because of serious technical defects.

SUMMARY OF THE INVENTION

The object of the present invention is therefore to provide a swivel bearing bracket of the aforementioned type which is comparatively simple and inexpensive to manufacture, yet can be rapidly and easily mounted and which assures durable fastening.

To achieve this object, according to the invention, the base body of the bracket carries fastening elements on its rear, spaced away from both sides of the rearwardly projecting support dome for one arm of the L-shaped visor support shaft. Each fastening element comprises hook means in the form of a cross member attached approximately perpendicularly upstanding from the base body and a hook formed at approximately a right angle on the free end of the cross member. One of the hooks is directed toward the left and the other toward the right. They are adapted to be passed through receiving openings formed in the ceiling of the vehicle. The cross section of each opening is greater than the cross section of the hook, so as to enable the hook to engage behind the ceiling wall upon a slight turning of the base body together with its hooks. Each cross member has a detent recess on the side facing away from the hook. To lock in the hooks, pins can be additionally inserted into the openings in the ceiling. The pins have detent noses which can be snapped into detent recesses which are provided on the cross members. Window like openings for the passage of the pins are developed in the base body.

The invention should satisfy a user's desire for a swivel bearing bracket which requires no screwing on for its attachment. The invention makes it possible to fasten the swivel bearing bracket to the metal sheet at the ceiling of the vehicle body simply by introducing the fastening elements into the respective openings in the ceiling, turning the base body about 7° to engage the hooks on the ceiling wall and then locking the hooks in place. In addition to the customary hole provided for the attachment dome, two additional holes are punched in the ceiling of the vehicle for the fastening elements. However, this does not require any additional expense, since openings had to previously be provided in the metal sheet of the car body also for receiving the fastening screws.

In accordance with a further development of the invention, the window like openings in the base body can be closed by covers which fit into the openings. The covers are connected as one piece with the base body by film hinges. The covers also support the pins which are formed integrally on the covers. This provides the advantage of a single piece development of the swivel bearing bracket and thus eliminates the manufacture and maintenance in stock of individual parts.

In another embodiment of the invention, the base body can be provided with a cover cap having the pins which are additionally to be introduced into the openings in the ceiling. In this case, the cover cap should preferably be comprised of a plastic injection molding and be developed integrally with the pins. These measures make it possible to produce the base body of different and particularly, inexpensive materials depending on the requirements established, since it is not necessary to take the quality of its exposed surface into account. The cover cap, in its turn, need satisfy no requirements as to strength. It merely serves a decorative function.

Other features and advantages of the present invention will become apparent from the following description of the invention which refers to the accompanying drawings.

DETAILED DESCRIPTION OF THE PREFERRED EMBODIMENTS

The swivel bearing bracket of the invention is developed as a plastic injection molding and is comprised of a relatively flat base body 1 of approximately rectangular or elliptical profile shape having a support dome 2 formed on its rear. The dome supports an end region of one arm of an L-shaped sun-visor support shaft 3. The dome is developed with a passage opening 4 for the shaft 3, which extends also through the base body 1.

Figure 1:
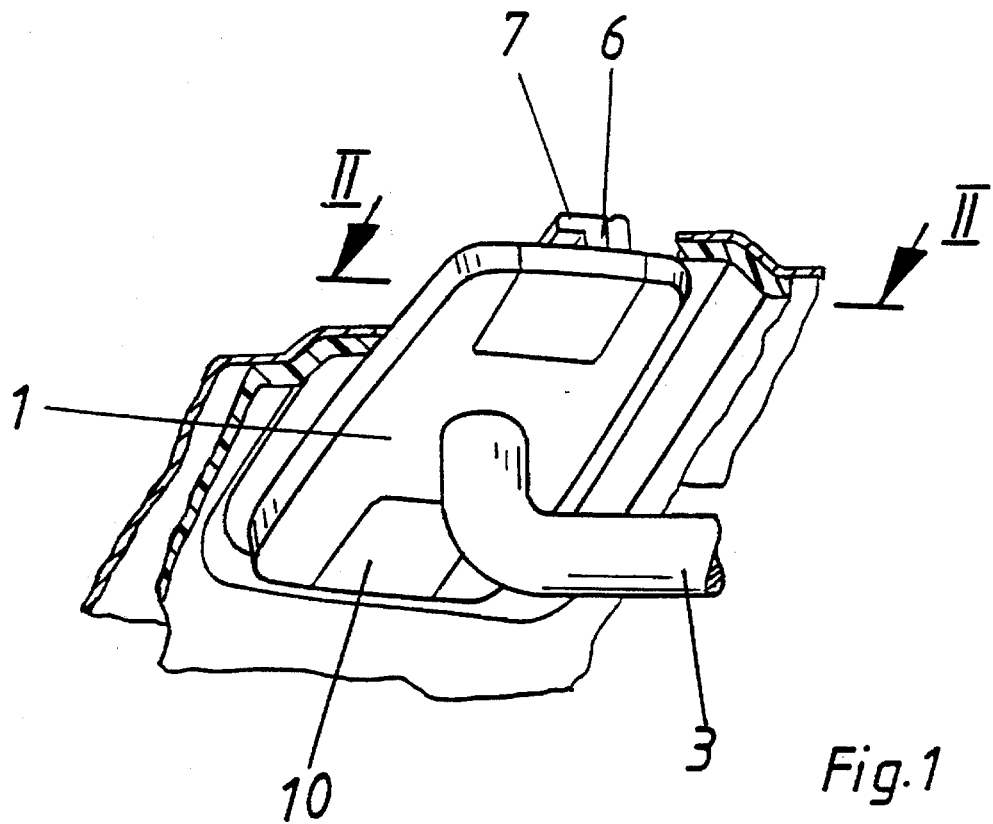
FIG. 1 is a perspective view of the swivel bearing bracket in accordance with a first embodiment in mounted condition.
Figure 2:
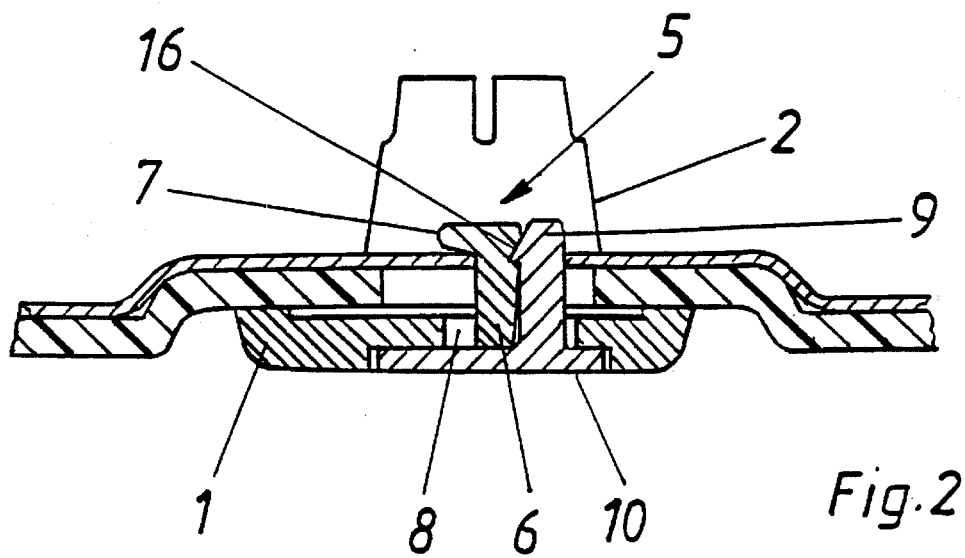
FIG. 2 is a cross-sectional view approximately along the line II—II of FIG. 1.
Figure 3:
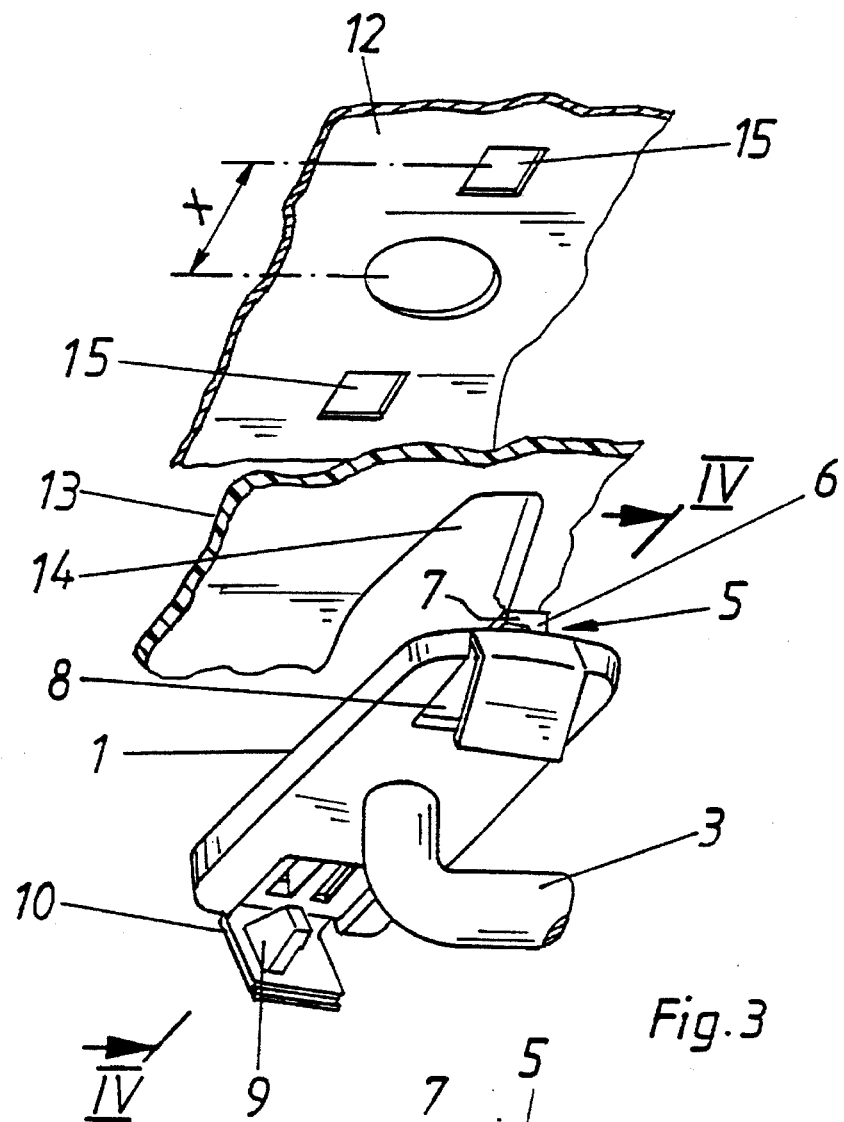
FIG. 3 is an exploded view in perspective showing the mounting of the swivel bearing bracket of FIG. 1.
Figure 4:
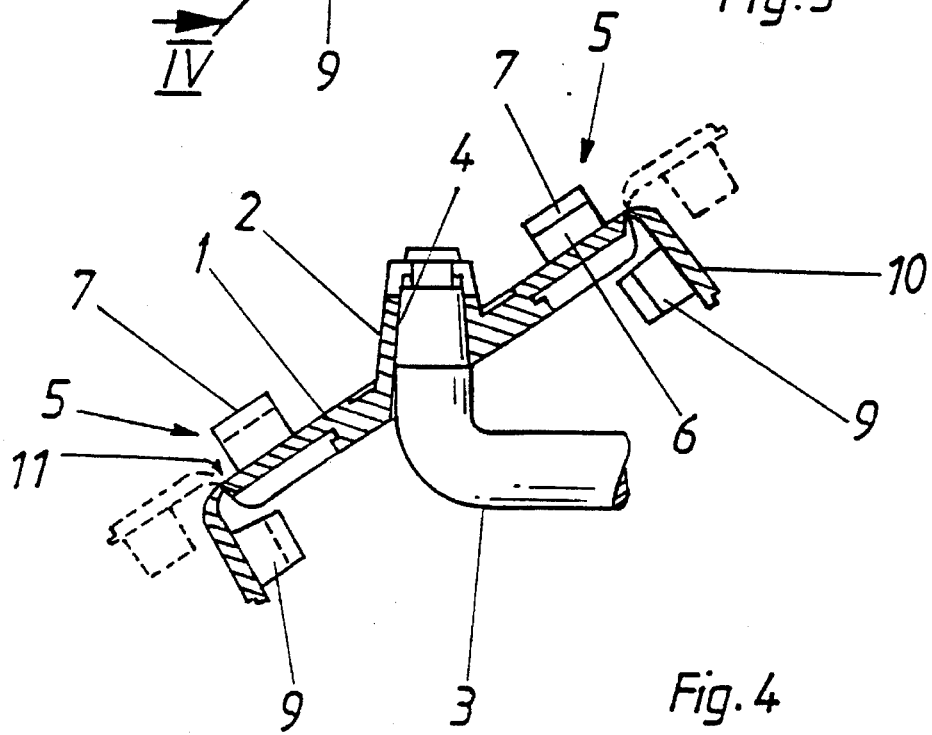
FIG. 4 is a cross section approximately along the line IV—IV of FIG. 3.

On the rear of the base body 1, there are fastening elements 5 which are spaced from opposite sides of the support dome 2 by a distance X. The fastening elements 5 are located on the longitudinal center line of the base body 1, above and below the support dome. Each fastening element is a hook means comprising a cross member 6 connected to the base body 1 and a hook 7 developed approximately at right angles on the free end of the cross member. As shown in FIG. 4, one hook 7 faces to the left and the other hook 7 faces to the right so that the bracket is attached to the vehicle ceiling wall by rotating the hooks into engagement through rotating the body 1.

The base body 1 further has window-like openings 8 which are developed in the region of the fastening elements and which serve for the introduction of pins 9 which secure the fastening arrangement of the swivel bearing bracket on the body of a vehicle. In the embodiment shown in FIGS. 1 to 4, the window-like openings 8 can be closed by covers 10 which fit in the openings. Each cover 10 is developed integrally with the base body 1 via a film hinge 11 and the cover also bears an integral pin 9. The position of the covers 10 with pins 9 as they are in the mold which formed the covers and therefore upon production, is indicated by dashed lines in FIG. 4.

For the mounting, the base body 1 as well as the sun-visor body (not shown) with the sun-visor shaft 3 can form a structural unit which is assembled in a traditional manner. In the delivered state, the covers 10 are open. In order to apply the swivel bearing bracket to the metal sheet 12 of the vehicle ceiling wall, the metal sheet is provided with a pattern of holes shown in FIG. 3, and a roof lining 13 which is generally present is also provided with a cutout 14. The installation (assembly-line construction) comprises introducing the fastening elements 5 into the square openings 15 in the ceiling of the vehicle. The base body 1 is thereupon turned slightly, for instance by 7°. In this way, the hooks 7 which are developed with a run-on bevel engage behind the metal sheet 12 of the vehicle ceiling. The two covers 10 are then merely swung into position. The pins 9 which are developed on the covers fill the free regions of the openings 15 in the ceiling and thus lock the fastening elements 5 in place. In addition to providing a friction lock, the pins 9 are provided with detent noses 17 which snap into detent recesses 16. Removal is possible by swinging the covers 10 outward, for instance, by forcing them out with a screwdriver.

Figures 5, 6:
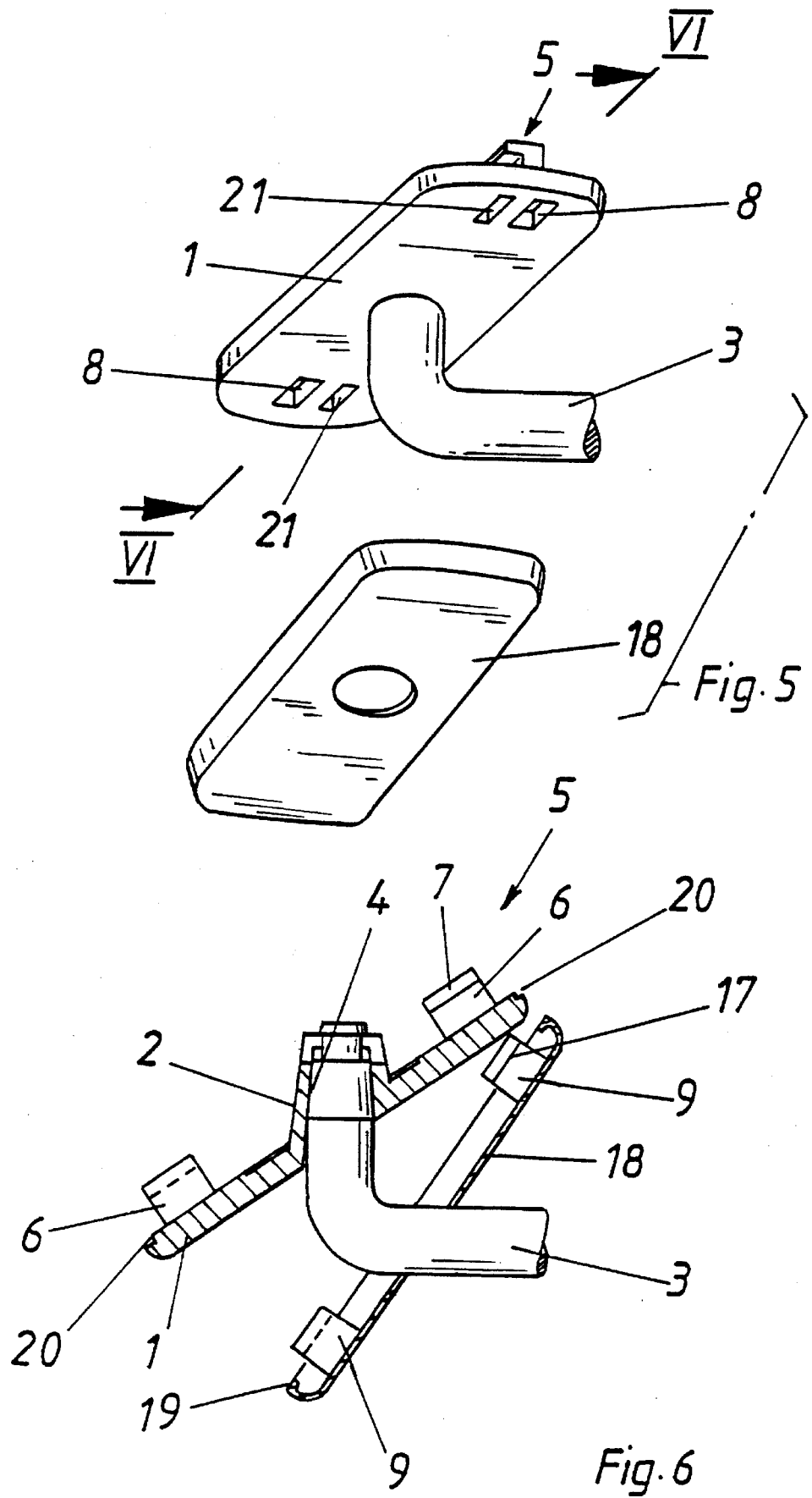
FIG. 5 is an exploded perspective view of a second embodiment.
FIG. 6 is a cross section approximately along the line VI—VI of FIG. 5.

In the embodiment in FIGS. 5 and 6, the base body has a similar construction to the first embodiment and corresponding reference numerals have been used. The pins 9 for locking the fastening elements 5 are not seated on covers 10, but they are instead formed in one piece on a separate part in the form of a cover cap 18 which can be placed on the base body 1. In the delivered state of a sun visor, the cover cap 18 is seated loosely on the sun-visor shaft 3, as shown in FIG. 6, so that the base body 1 can be placed, in the manner described on the basis of FIGS. 1 to 4, on the metal sheet 12 of the vehicle ceiling. To lock the fastening elements 5, it is merely necessary to press the cover cap 18 onto the base body 1. The pins 9 then pass into the openings 15 in the ceiling.

In addition to the detent noses 17, a further clip attachment can be provided between the base body 1 and the cover cap 18. For this purpose, the base body 1 has detent recesses 20 and the cover cap 18 has detent projections 19.

The window-like openings 8 in the base body 1 serve for the passage of the pins 9, while the additional openings 21 serve for forming of the hooks 7 in the mold, and therefore have no function.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A swivel bearing bracket for a vehicle sun visor for being attached on the ceiling of the vehicle comprising:

a flange like base body having a rear side, a shaft support on the rear side for supporting an end region of a sun-visor shaft, and a passage opening through the base body for the shaft to extend to the support;

first and second fastening elements formed on the rear side of the base body, each fastening element being spaced from the shaft support, each fastening element including hook means which hook on to the ceiling of the vehicle by movement of the base body to move the hooks in respective opposite directions;

the ceiling of the vehicle having a respective opening therein for each fastening element, each ceiling opening having a cross section that is greater than the cross section of the hook means at the opening, whereby the hook means may be pushed into the respective opening, and after turning of the base body in one direction, the hook means hook onto the ceiling to hold the base body to the ceiling;

a respective additional pin for each of the hook means and introducible into the respective opening along with the hook means in the ceiling and upon such insertion, the pin being positioned with respect to the hook means for holding the hook means hooked to the ceiling.

2. The swivel bearing bracket of claim 1, further comprising window like openings formed in the base body for the passage of the pins therethrough extending into the openings in the ceiling.

3. The swivel bearing bracket of claim 2, wherein the first and second fastening elements are on opposite sides of the support, and the respective openings in the ceiling are respectively placed at the fastening elements.

4. The swivel bearing bracket of claim 1, wherein the support comprises a dome formed at the rear side of the base body and in which the sun visor shaft is received.

5. The swivel bearing bracket of claim 3, wherein each of the hook means comprises a cross member which is approximately perpendicular to the base body to extend into the ceiling and having a free end, and a hook formed approximately at right angles to the respective cross member at the free end thereof, with the hooks of the first and second fastening elements facing in opposite directions.

6. The swivel bearing bracket of claim 5, wherein the respective pin for each of the hook means is positioned on the side of the hook means away from the direction toward which the hook faces.

7. The swivel bearing bracket of claim 6, further comprising means for locking the pin to the hook means in the opening.

8. The swivel bearing bracket of claim 7, wherein the locking means comprises each cross member having a detent recess thereon on the side thereof which faces away from the hook, each pin having a detent nose shaped and positioned for being received in the detent recess when the pin is installed in the opening in the vehicle body so that the detent nose can be snapped into the detent recess and can be removed therefrom for enabling removal of the base body from the ceiling.

9. The swivel bearing bracket of claim 2, further comprising covers fittable over the window like openings in the base body, the covers carrying the pins which are inserted in the openings in the ceiling when the covers are placed over the window like openings.

10. The swivel bearing bracket of claim 9, wherein the covers are attached by hinges to the base body so as to swivel into a position with the pins in the holes in the ceiling.

11. The swivel bearing bracket of claim 10, wherein the bracket is comprised of a plastic injection molding.

12. The swivel bearing bracket of claim 1, further comprising a single cover cap on which the pins are so located that upon installation of the cap to the base body, the pins are installed in the openings in the ceiling for the respective hook means.

13. The swivel bearing bracket of claim 12, wherein the cover cap comprises a plastic injection molding and the pins are developed integrally on the cover cap.

14. The swivel bearing bracket of claim 1, wherein the first and second fastening elements are on opposite sides of the support, and the respective openings in the ceiling are respectively placed at the fastening elements.

15. The swivel bearing bracket of claim 1, wherein each of the hook means comprises a cross member which is approximately perpendicular to the base body to extend into the ceiling and having a free end, and a hook formed approximately at right angles to the respective cross member at the free end thereof, with the hooks of the first and second fastening elements facing in opposite directions.

* * * * *